United States Patent [19]
Choi et al.

[11] Patent Number: 5,532,812
[45] Date of Patent: Jul. 2, 1996

[54] APPARATUS FOR FORMING A COPY OF AN ORIGINAL IMAGE ON A SHEET OF PAPER

[75] Inventors: Min-ho Choi; Kyung-hwan Kim; Byeong-sik Cheon, all of Suwon; Young-gi Kim, Euiwang; Hwa-seong Shin; Yong-kook Kim, both of Suwon, all of Rep. of Korea

[73] Assignee: Samsung Electronics Co., Ltd., Kyungki-do, Rep. of Korea

[21] Appl. No.: 319,811

[22] Filed: Oct. 7, 1994

[30]   Foreign Application Priority Data

Apr. 12, 1994 [KR] Rep. of Korea ............... 94-7658
Apr. 12, 1994 [KR] Rep. of Korea ............... 94-7659
Apr. 30, 1994 [KR] Rep. of Korea ............... 94-9548
Jun. 30, 1994 [KR] Rep. of Korea ............... 94-15690

[51] Int. Cl.$^6$ ................... G03G 15/01; G03G 15/04
[52] U.S. Cl. ................... 355/327; 355/271; 347/119
[58] Field of Search ................... 355/326 R, 327, 355/271, 274; 347/115, 119, 232

[56]   References Cited

U.S. PATENT DOCUMENTS

| 4,063,724 | 12/1977 | Suda . |
| 4,615,612 | 10/1986 | Ohno et al. . |
| 5,014,095 | 5/1991 | Yamada . |
| 5,282,012 | 1/1994 | Terada et al. ............ 355/327 |

FOREIGN PATENT DOCUMENTS

58-207021  12/1983  Japan ................... 355/327

*Primary Examiner*—Joan H. Pendegrass
*Attorney, Agent, or Firm*—Leydig, Voit & Mayer

[57]   ABSTRACT

An image forming apparatus includes a plurality of image forming units each having a photoconductive drum for forming a latent image and a developing device for developing the latent image, for providing different-color developed images, an exposing device for projecting light according to image information, and a plurality of mirror members for controlling the optical passage of the exposing device so as to expose a selected photoconductive drum without shifting the exposing device, thereby simplifying the apparatus and allowing for a stable drive.

20 Claims, 7 Drawing Sheets

APPARATUS FOR FORMING A COPY OF AN ORIGINAL IMAGE ON A SHEET OF PAPER

BACKGROUND OF THE INVENTION

The present invention relates to an image forming apparatus for forming an image received from an original document or an image signal on a sheet of paper, and more particularly, to an image forming apparatus for forming a multicolored, unicolored or monochromic image by using different-colored developers.

In order to print an intended image with the image forming apparatus such as a copy machine, printer or facsimile, first, a photosensitive material is exposed according to image information obtained from an original document or a predetermined image source, thereby forming a latent image. Then, a developer (e.g., toner) sticks to the portion where the latent image is formed, in order to develop the image. The developed image is transferred and fixed on a sheet of paper.

To form a color image, usually three (or four) developers for yellow, magenta and cyan (sometimes including black) are used. Being contained in respective developing devices, different-color developers are sequentially selected, adhered to the portion of the latent image of the photosensitive material, and transferred onto a sheet of paper. A color image forming apparatus with a plurality of developers respectively containing the different-color developers is divided into a fixed type and a rotary type according to the arrangement of the developing devices.

In the fixed type, a plurality of developing devices are fixedly disposed near a photoconductive drum so that a selected developing device operates to apply its developer to the photoconductive drum at its own position (see U.S. Pat. No. 4,063,724).

In the rotary type, the developing devices are radially incorporated in a rotator rotatably installed adjacent to the photoconductive drum. The rotator rotates so that the selected developing device moves to the development area of the photoconductive drum (see U.S. Pat. No. 4,615,612).

The fixed-type apparatus is unfavorable for miniaturization because a large-diameter photoconductive drum is needed to secure sufficient space for a plurality of developing devices. Further, since distances from a portion where forming of the latent image of photoconductive material starts, i.e., the portion to be exposed, to a development portion of respective developing devices, are different, the residual potential of latent image is different at respective development portions. For this reason, the density of respective colors developed is not uniform, resulting in poor In the rotary type apparatus at least one developing unit turns upside down when the rotator rotates, the developer contained therein leaks to and contaminate the interior of the apparatus. This is detrimental to the maintenance of the apparatus. Moreover, a high driving torque is required to drive the rotator. Therefore, when the rotator rotates, severe vibration and loud noise are generated, which prevents stable driving. This results in poor picture quality.

Figure 1:
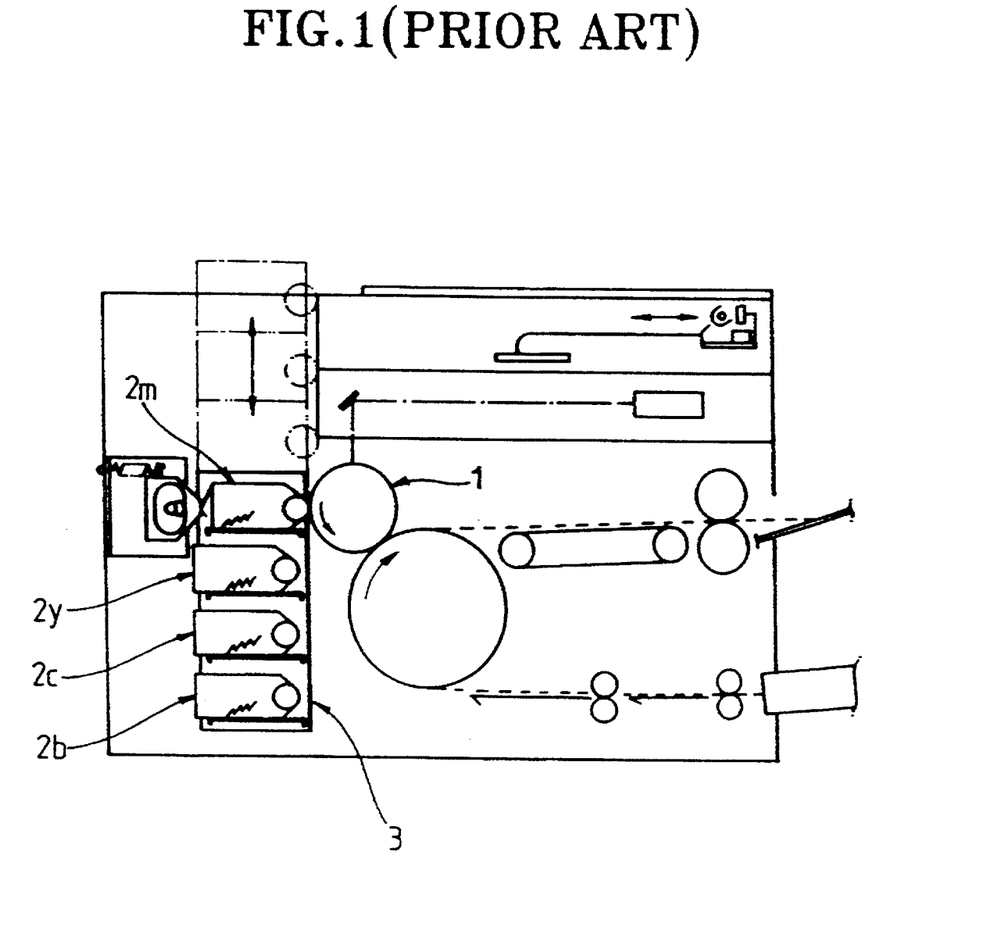
FIG. 1 is a schematic side view of a conventional image forming apparatus having movable developing units.

U.S. Pat. No. 5,014,095 discloses another image forming apparatus which has a different mode from the above-discussed fixed and rotary type. This image forming apparatus, as shown in FIG. 1, comprises an elevation box 3 in which four developing units 2m, 2y, 2c and 2b are stacked. The box 3 is lowered or raised so that a developing unit selected on one side of photoconductive drum 1 moves to the development position of photoconductive drum 1. In this type in which developing devices 2m, 2y, 2c and 2b are lowered or raised, the ununiformity of image density caused due to the difference of potential of the latent image between respective developers are removed and the contamination due to the leakage of developer is prevented. However, this mode is still disadvantageous in miniaturization because sufficient space is needed for moving box 3 accommodating developing devices 2m, 2y, 2c and 2b Further, driving power of high torque must be used, which is a hinderance to the stable driving of the apparatus, and the enhancement of picture quality is not so effective.

SUMMARY OF THE INVENTION

Therefore, in order to overcome such problems, it is an object of the present invention to provide an image forming apparatus which is compact by optimizing the arrangement and driving mode of a plurality of developing devices.

It is another object of the present invention to provide an image forming apparatus which can be driven with a low torque to enable a stable operation.

It is still another object of the present invention to provide an image forming apparatus which eliminates problems in connection with the leakage of a developer from a plurality of developing devices.

It is yet another object of the present invention to provide an image forming apparatus which enables high-speed printing without deteriorating picture quality.

To accomplish the objects of the present invention, there is provided an image forming apparatus for forming an image on a sheet of paper according to image information, the apparatus comprising: a plurality of image forming units each having a photoconductive drum for forming a latent image by means of exposing, and a developing device for containing a predetermined-color developer and developing the latent image, for providing different-color developed images; an exposing device for projecting light according to the image information; optical passage control means for controlling the optical passage of the light projected from the exposing device so as to expose the photoconductive drum of a selected image forming unit among the plurality of image forming units; transfer means for transferring the image developed by the selected photoconductive drum from the photoconductive drum of the plurality of image forming units onto the sheet of paper; and paper feeding/ejecting means for feeding the sheet of paper to the transfer means and ejecting the sheet of paper therefrom.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Preferred embodiments of the image forming apparatus of the present invention will be described below with reference to the attached drawings.

Figure 2:
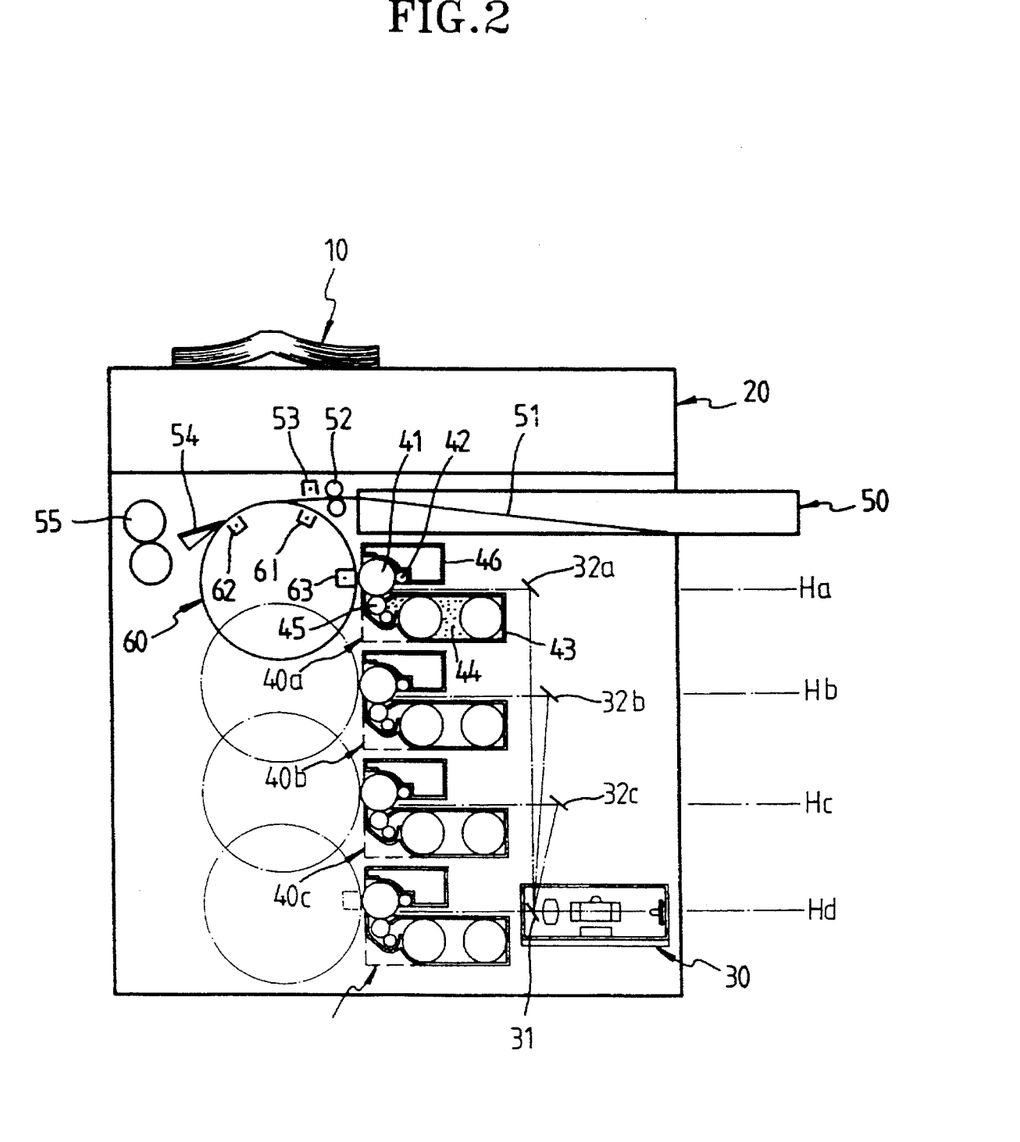
FIG. 2 is a schematic side view of an image forming apparatus of a first embodiment of the present invention.

In the first embodiment of the image forming apparatus of the present invention shown in FIG. 2, reference numeral 10 indicates an original document. Reference numeral 20 is a scanning unit. Reference numeral 30 is an exposing device. Reference numerals 40a–40d are image forming units. Reference numeral 50 is a paper cassette. Reference numeral 60 is a transfer drum.

In the apparatus, scanning unit 20, a general optical device for optically scanning original document 10, outputs an electrical image signal corresponding to image information of the scanned original document 10 and transmits the signal to exposing device 30.

Exposing device 30 projects, for instance, a laser beam according to the transmitted electrical image signal. One first mirror member 31 and three second mirror members 32a, 32b and 32c for controlling the passage of the projected laser beam are installed between the exposing device 30 and image forming units 40a–40d. First mirror member 31, for instance, a galvanometer mirror, rotates at various predetermined angles so that it transmits the laser beam straightforward or selectively reflects the beam onto the second mirror members 32a, 32b and 32c which are fixed at different positions. Second mirror members 32a, 32b and 32c reflect the laser beam reflected from the first mirror member 31 to the respective photoconductive drums of the front image forming units in front of the respective second mirror members at respective positions Ha, Hb, Hc and Hd.

Each of image forming units 40a–40d includes a photoconductive drum 41, a charging roller 42 for charging photoconductive drum 41, a developing device 43 containing a toner 44 and having a developing roller 45 for developing toner 44 onto photoconductive drum 41, and a cleaner 46 for removing the remaining toner adhered on photoconductive drum 41. The four image forming units 40a–40d are stacked so as to provide a developed image of four colors, e.g., black, yellow, magenta and cyan, sequentially from the top. Initially, the surface of photoconductive drum 41 is uniformly charged by charging roller 42. An electrostatic latent image, which cannot be distinguished by the human eye, is formed on the surface portion of the photoconductive drum where the electric potential is reduced by means of exposure of exposing device 30. Developing device 43 rotates developing roller 45 so as to adsorb internally contained toner 44 on the electrostatic latent image formed on photoconductive drum 41 and develop the electrostatic latent image, to thereby form a visible image.

Paper cassette 50 contains sheets of paper 51 and supplies one sheet of paper at a time via supply roller 52 toward a rotating transfer drum 60. 51 to be supplied is charged by paper charger 53, and simultaneously therewith, the transfer drum 60 is charged by drum charger 61 so that the paper 51 is adsorbed on the circumference of transfer drum 60. A discharger 62, separator 54 and fixing roller 55 are constructed as an exit means in which the sheet of paper 51 bearing an image is separated from transfer drum 60 and ejected outside the apparatus, after the image is fixed onto the sheet of paper 51. Here, discharger 62 removes the remaining charges in the paper sheet 51 so that it is separated from transfer drum 60. Separator 54 rakes across discharged paper sheet 51 from transfer drum 60 and guides it to fixing roller 55.

Transfer drum 60 comprises a transfer charger 63 in addition to drum charger 61 and discharger 62. Transfer drum 60 is lowered or raised by the driving means so as to be brought to the height of photoconductive drum 41 contained in an image forming unit selected for transfer. Chargers 61 and 63 and discharger 62 are lowered or raised together with transfer drum 60. During paper feeding, paper ejecting and transfer, transfer drum 60 rotates but chargers 61 and 63 and discharger 62 do not.

In the preferred image forming apparatus of the present invention, as shown in FIG. 2, transfer drum 60 is initially located at the topmost position Ha, a black toner 44 is received in topmost developing device 43 of image forming unit 40a, and yellow, magenta and cyan toners are received in the other developing devices. If a black image is formed, in the state in which transfer drum 60 stays at the initial position, paper feeding, exposing, development, transfer and paper ejecting are performed sequentially.

If a color image is printed, first a sheet of paper 51 is supplied from paper cassette 50 to transfer drum 60, and transfer drum 60 is shifted to a selected position according to a predetermined sequence. At the selected position, exposing, development and transfer are performed sequentially for printing. At another position, the printing is repeated for an image of an intended color. Finally, when the printing is finished, transfer drum 60 returns to the topmost position Ha and the sheet of paper 51 is ejected.

In the image forming apparatus of the present invention, unicolors such as red mixed with yellow and, magenta, green mixed with yellow and cyan, and blue mixed with magenta and cyan, can be printed as well as black and natural colors.

Figure 3:
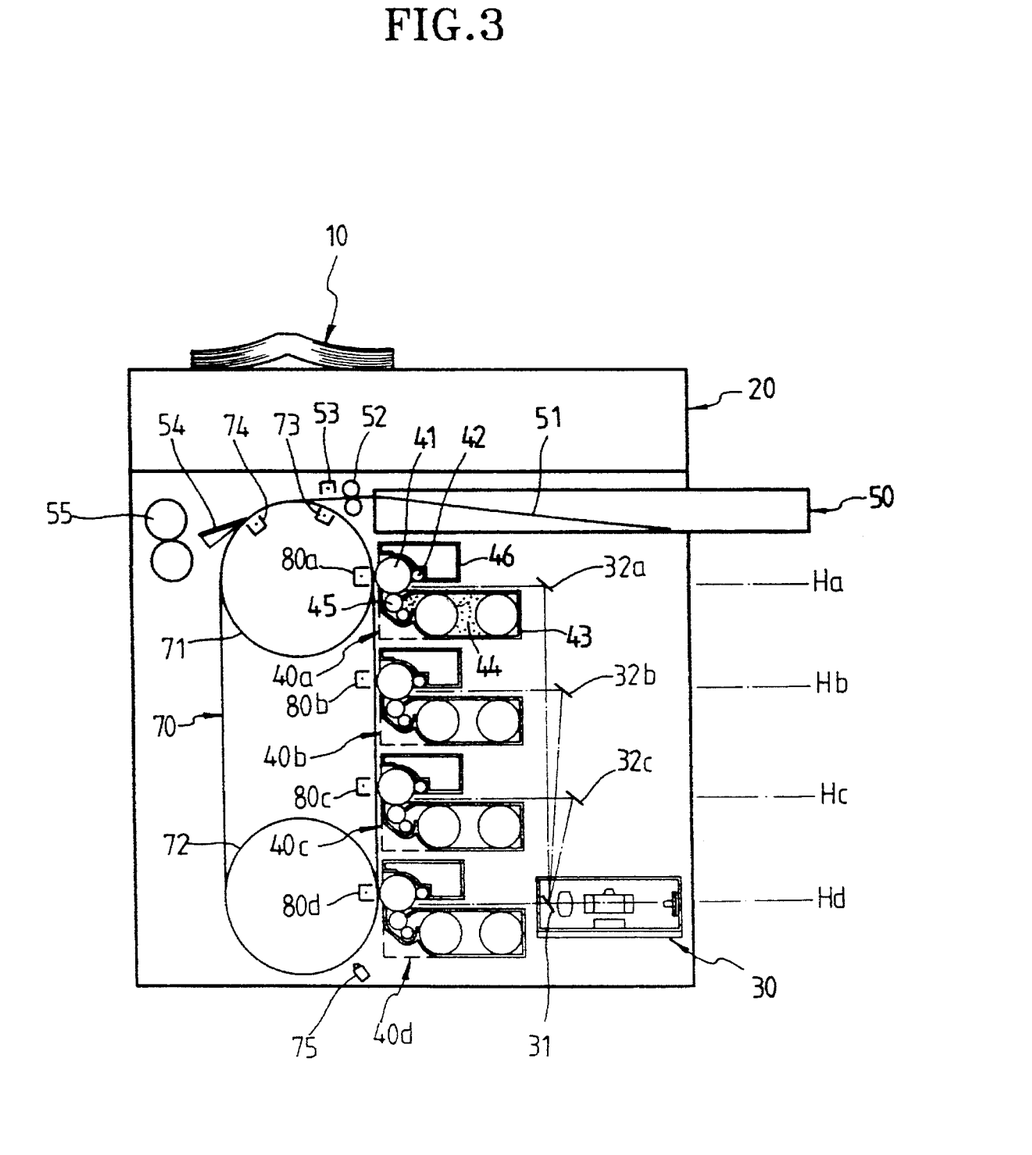
FIG. 3 is a schematic side view of a second embodiment of the image forming apparatus of the present invention.

FIG. 3 shows the second embodiment of the image forming apparatus of the present invention comprising an endless belt 70 instead of the transfer drum 60. Endless belt 70, tightly provided as seamless around two driving-support rollers 71 and 72 which are detached from each other up and down, rotates to convey the sheet of paper 51 adhered or fixed thereon. Endless belt 70 is charged by belt charger 73 so as to fix the sheet of paper to be supplied. The charged state of the endless belt is removed by discharger 74 so that the sheet of paper 51 may be separated therefrom. At a predetermined position around endless belt 70 are disposed a paper sensor 75 for detecting the leading edge of the sheet of paper 51 adhered thereon and generating an electrical signal, and four transfer chargers 80a–80d fixed at a corresponding position of respective photoconductive drums 41 of image forming units 40a–40d and for transferring the developed image of photoconductive drums 41 onto the sheet of paper 51. In practice, the electrical signal determines a starting time point of exposure and development, considering the distance from the sensor to the development position of selected photoconductive drum 41 and the conveying speed of the endless belt 70.

In the embodiment of the image forming apparatus of the present invention, if one color of the developers of developing devices 43 of image forming units 40a–40d is printed, the sheet of paper 51 is set to circulate endless belt 70 by one revolution. If other unicolors or natural colors are printed, the sheet of paper 51 is set to circulate endless belt 70 by at least two revolutions or, at the most, four revolutions.

Figure 4:
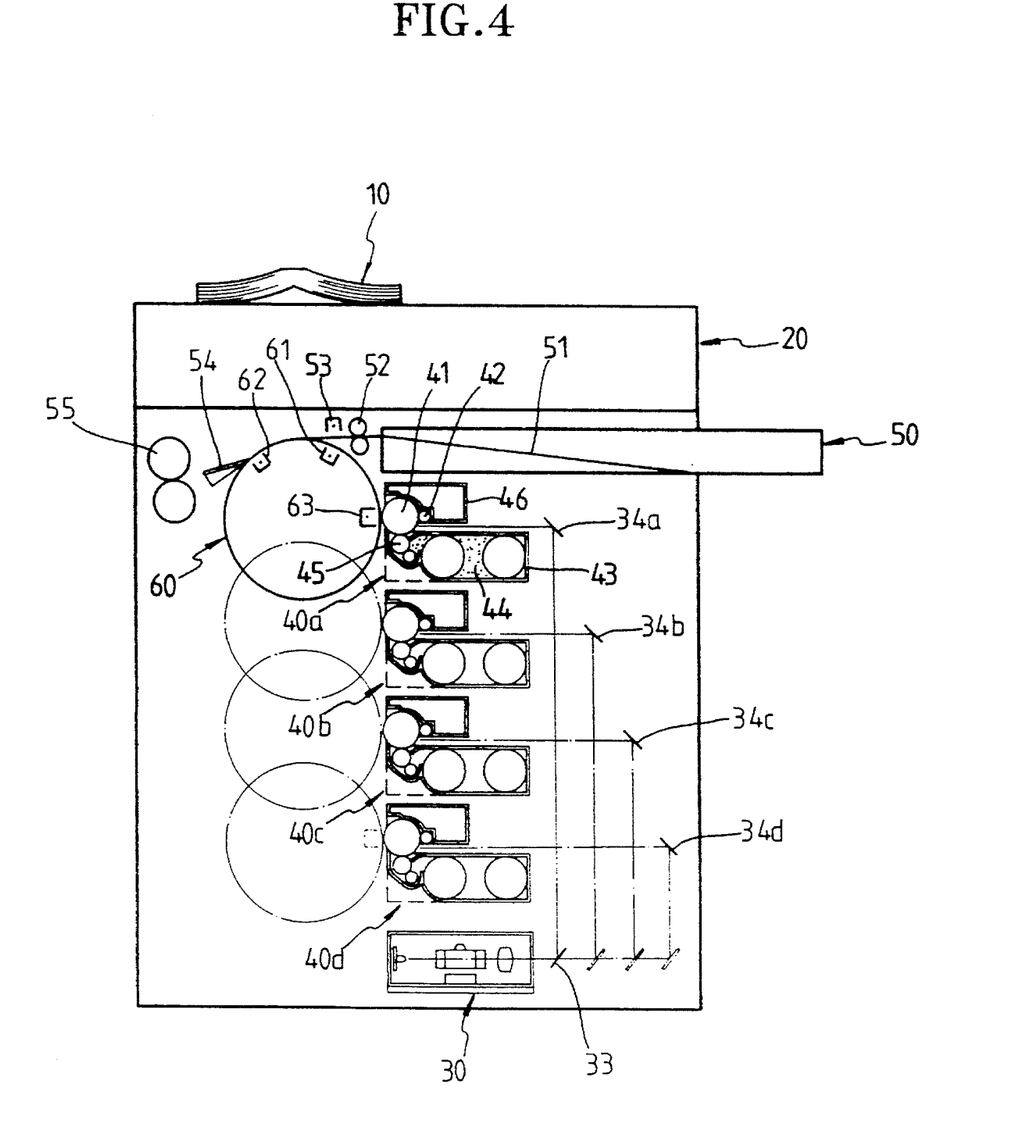
FIG. 4 is a schematic side view of a third embodiment of the image forming apparatus of the present invention.
Figure 5:
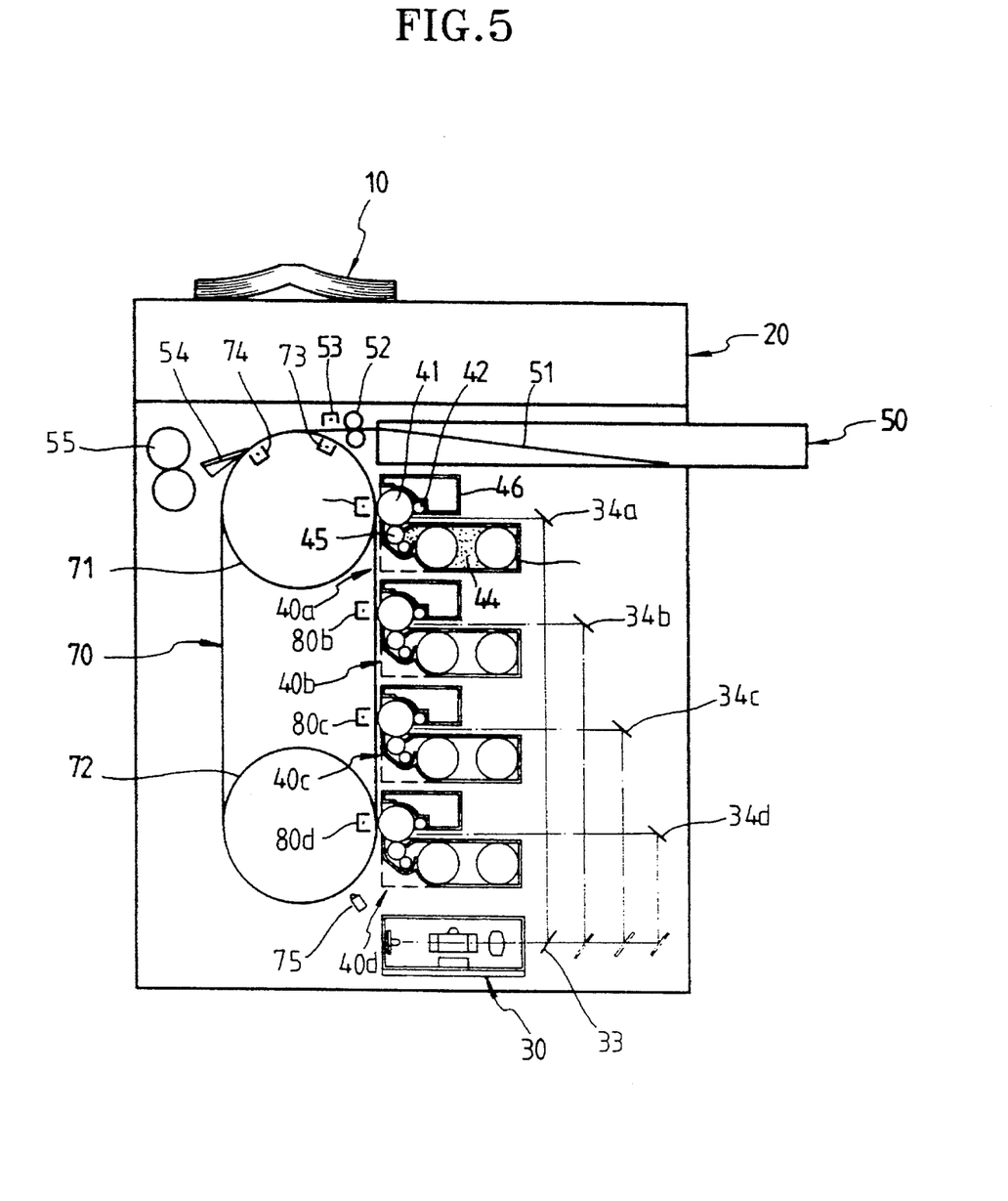
FIG. 5 is a schematic side view of a fourth embodiment of the image forming apparatus of the present invention.

FIGS. 4 and 5 show third and fourth embodiments of image forming apparatus of the present invention, which comprise one third mirror member 33 and four fourth mirror members 34a–34d disposed between exposing device 30 and photoconductive drums 41 of image forming units 40a–40d. The arrangement of the mirror members is provided so that the optical passage from exposing device 30 to photoconductive drums 41 is the same and thereby the same size of beam spot is formed on the photoconductive drums 41. The arrangement is described with reference to FIG. 6.

Figure 6:
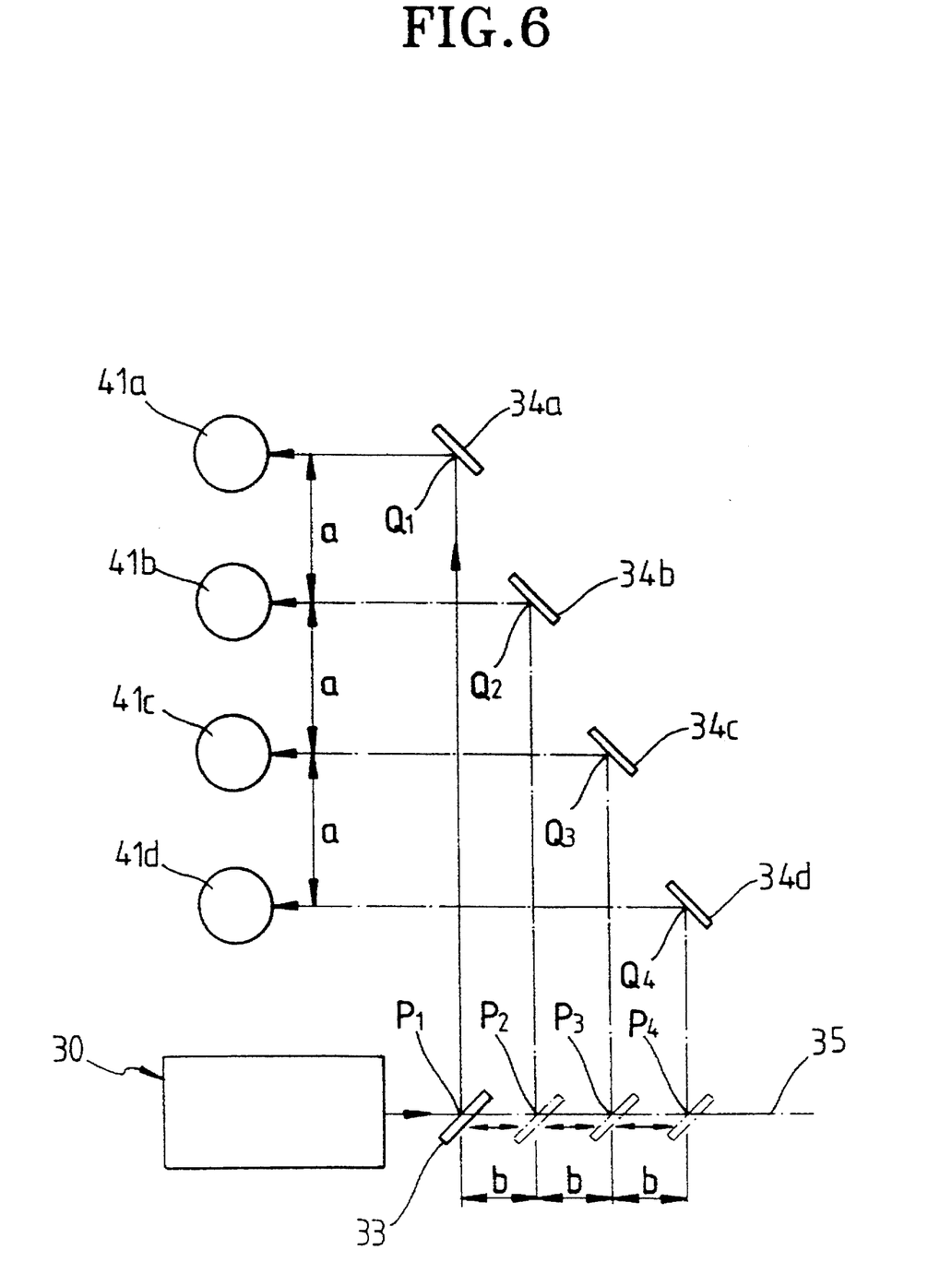
FIG. 6 is an arrangement diagram for explaining the arrangement condition of mirror members disposed between the exposing optical system and photoconductive drum shown in FIGS. 4 and 5.

In FIG. 6, third mirror member 33 is installed at 45° along the optical axis 35 of exposing device 30 so as to move to four positions $P_1$–$P_4$ designated along the optical axis 35 at predetermined intervals. The interval b between the four positions $P_1$–$P_4$ corresponds to half the interval a between photoconductive drums 41a–41d. Four fourth mirror members 34a–34d are installed relative to the 45° at intersections $Q_1$–$Q_4$ of the horizontal lines passing the center of respective photoconductive drums 41a–41d and the vertical lines passing the positions $P_1$–$P_4$.

Figure 7:
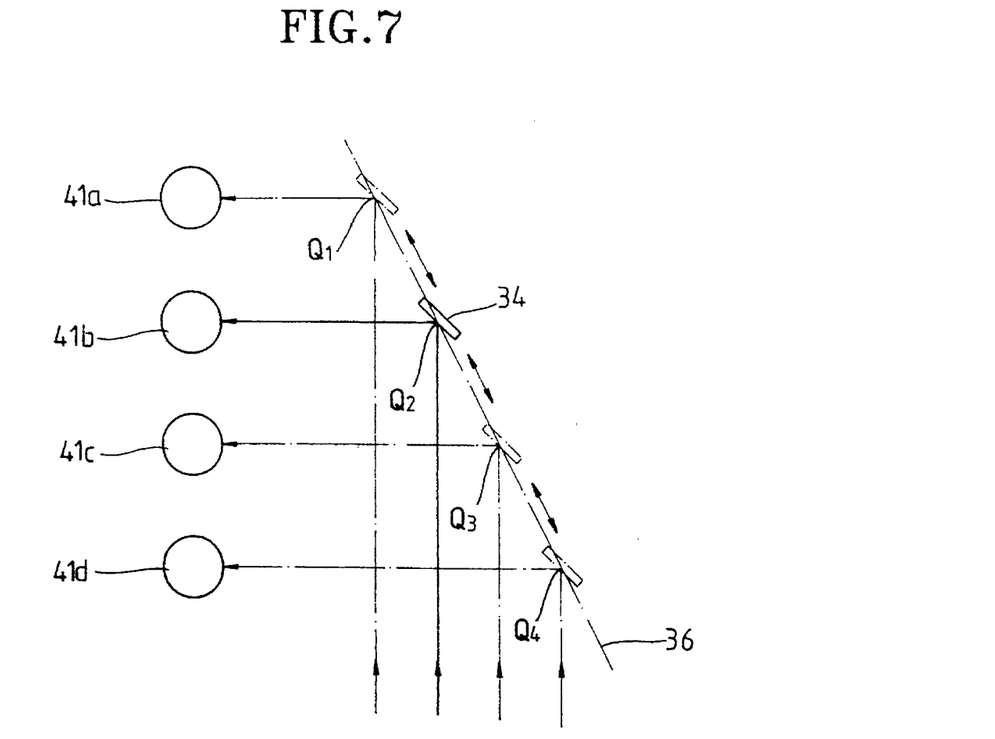
FIG. 7 is an arrangement diagram of another embodiment of the second reflecting means shown in FIG. 6.

FIG. 7 shows a construction in which the four fourth mirror members 34a–34d of FIG. 6 are replaced with a first movable mirror 34 movably installed along an extension line 36 passing intersections $Q_1$–$Q_4$. The first movable mirror 34 shifts in synchronization with third mirror member 33.

Figure 8:
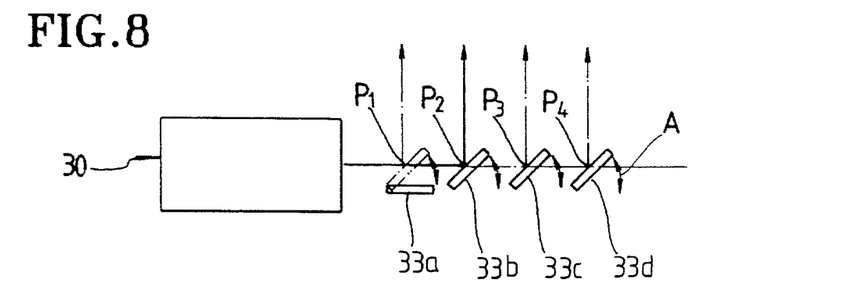
FIG. 8 is an arrangement diagram of another embodiment of the first reflecting means shown in FIG. 6.
Figure 9:
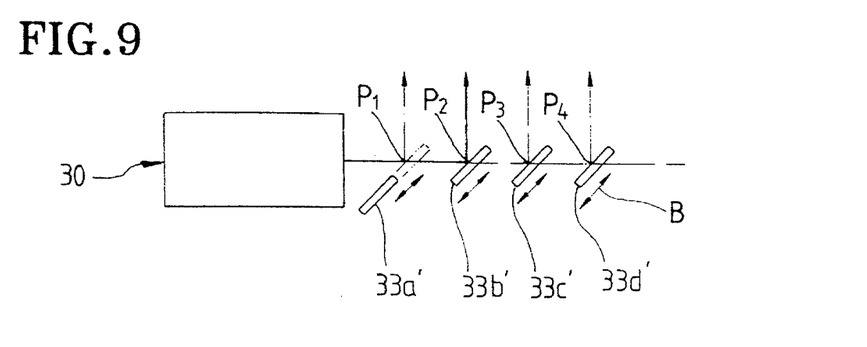
FIG. 9 is an arrangement of yet another embodiment of the first reflecting means shown in FIG. 6.

FIGS. 8 and 9 show second movable mirrors 33a–33d or 33a'–33d' installed at respective positions $P_1$–$P_4$, substituting for the third mirror member 33 of FIG. 6. Second movable mirrors 33a–33d of FIG. 8 each pivot on one end in a direction of arrow A so as to reflect or pass the laser beam projected from exposing device 30. Second movable mirrors 33a'–33d' of FIG. 9 each reciprocate across the optical axis in a direction of arrow B respective positions $P_1$–$P_4$ so as to reflect or pass the laser beam projected from exposing device 30.

As described above, the image forming apparatus of the present invention is compact because it is constructed so that the sheet of paper is delivered by conveying a transfer drum or using an endless belt, and the four large developing devices are fixed. This enables relatively stable driving at low torque and results in yielding a good quality image. Further, since the four image forming units are fixed, there is no problem with developer leakage. Furthermore, the respective image forming units can be replaced individually, thereby facilitating the maintenance of the apparatus such as the replenishing of developer.

In addition, in order to select and expose a plurality of photoconductive drums with one exposing device, since a mirror for controlling the optical passage therebetween is used, there is no need of moving the exposing device. The mirror also enables the optical passage from the exposing device to the respective photoconductive drums and the size of a latent image formed on the photoconductive drums to be uniformly maintained, resulting in stable driving and good quality prints at low cost.

What is claimed is:

1. An image forming apparatus for forming an image on a sheet of paper comprising:

a plurality of image forming units, each image-forming unit having photoconductive drum for forming a latent image by exposure and a developing device for containing a respective color developer for developing the latent image, thereby providing different colored developed images;

an exposing device for projecting light according to image information;

optical passage control means for controlling passage of the light projected by said exposing device to expose the photoconductive drum of a selected image forming unit among said plurality of image forming units;

transfer means for transferring an image developed by the selected image forming unit from the photoconductive drum of the selected image forming unit onto a sheet of paper;

paper feeding and ejecting means for feeding the sheet of paper to said transfer means and for ejecting the sheet of paper; and means for moving said transfer means to respective positions corresponding to each of said image forming units.

2. The image forming apparatus as claimed in claim 1, wherein each of said plurality of image forming units includes charging rollers for charging said photoconductive drum and a cleaner for removing a developer remaining on said photoconductive drum.

3. The image forming apparatus as claimed in claim 1, wherein said transfer means comprises:

a rotatable transfer drum for winding the sheet of paper supplied from said paper feeding and ejecting means around said transfer drum;

a drum charger for electrically charging said transfer drum so that the supplied sheet of paper is adhered to said transfer drum;

a discharger for removing electrical charge from said transfer drum; and a transfer charger for transferring an image developed on said photoconductive drum to the sheet of paper adhered to said transfer drum, wherein said transfer drum and said drum charger are moved together to respective positions corresponding to each said plurality of image forming units.

4. The image forming apparatus as claimed in claim 1, wherein said optical passage control means comprises:

a first mirror member installed on an optical axis of said exposing device and rotated at various angles so that the light of said exposing device is passed or reflected in a selected direction; and a plurality of second mirror members each fixedly installed at a height corresponding to a respective photoconductive drum of said plurality of image forming units for reflecting the light reflected by said first mirror member to said respective photoconductive drums.

5. The image forming apparatus as claimed in claim 1, wherein said optical passage control means comprises:

a first mirror member movable to a plurality of positions at predetermined intervals along an optical axis of said exposing device for reflecting the light of said exposing device; and a plurality of second mirror members, each second mirror member being fixedly installed at a height corresponding to a respective photoconductive drum of said plurality of image forming units for reflecting the light reflected by said first mirror member to said respective photoconductive drums.

6. The image forming apparatus as claimed in claim 5, wherein said exposing device has an optical axis perpendicular to an extension of a line passing through the photoconductive drums of said plurality of image forming units, and said second mirror members are installed at intersections of vertical lines passing through the plurality of positions along the optical axis and horizontal lines passing through centers of said photoconductive drums.

7. The image forming apparatus as claimed in claim 6, wherein the distance between the plurality of positions along the optical axis is half the distance between the centers of the photoconductive drums of said plurality of image forming units.

8. The image forming apparatus as claimed in claim 1, wherein said exposing device has an optical axis perpendicular to an extension of a line passing through the photoconductive drums of said plurality of image forming units, said optical passage control means comprising:

a first mirror member movable to a plurality of positions at intervals along the optical axis of said exposing device for reflecting the light of said exposing device; and a second mirror movable in synchronization with said first mirror member along an extension of a line passing through intersections of vertical lines passing through the plurality of positions and horizontal lines passing through centers of said photoconductive drums, and moving to a selected intersection to reflect light reflected by said first mirror member to said respective photoconductive drums.

9. The image forming apparatus as claimed in claim 1, wherein said optical passage control means comprises:

a plurality of first movable mirrors installed at a plurality of positions at predetermined intervals along the optical axis of said exposing device for passing or reflecting the light of said exposing device; and a plurality of second mirror members, each second mirror member being fixedly installed at a height corresponding the a respective photoconductive drum of said plurality of image forming units for reflecting the light reflected by said plurality of first mirrors to said respective photoconductive drums.

10. The image forming apparatus as claimed in claim 9, wherein each of said plurality of first movable mirrors each are installed to pivot at one end.

11. The image forming apparatus as claimed in claim 9, wherein each of said plurality of first movable mirrors reciprocate across the optical axis each of the plurality of positions.

12. The image forming apparatus as claimed in claim 1, wherein said exposing device has an optical axis perpendicular to an extension of a line passing through the photoconductive drums of said plurality of image forming units, said optical passage control means comprising:

a plurality of first movable mirrors installed at a plurality of positions at predetermined intervals along the optical axis of said exposing device for passing or reflecting the light of said exposing device; and a second movable mirror movable along an extension of a line passing through intersections of vertical lines passing through the plurality of positions and horizontal lines passing through centers of said photoconductive drums, and moving to a selected intersection to reflect the light reflected by said plurality of first movable mirrors to said respective photoconductive drums.

13. An image forming apparatus for forming an image on a sheet of paper comprising:

a plurality of image forming units, each image forming unit having a photoconductive drum for forming a latent image by exposure and a developing device for containing a respective color developer for developing the latent image, thereby providing different color developed images;

an exposing device for projecting light according to image information;

optical passage control means for controlling optical passage of the light projected from said exposing device to expose the photoconductive drum of a selected image forming unit among said plurality of image forming units, said optical passage control means comprising:

a first mirror member movable to a plurality of positions at intervals along an optical axis of said exposing device for reflecting the light of said exposing device; and a plurality of second mirror members, each second mirror member being fixedly installed at a height corresponding to a respective photoconductive drum of said plurality of image forming units for reflecting the light reflected by said first mirror member to said respective photoconductive drums;

transfer means for transferring an image developed by the selected image forming unit from the photoconductive drum of the selected image forming unit onto a sheet of paper, said transfer means comprising:

two driving-support rollers, at least one of said driving support rollers being drivable;

an endless belt installed around said two driving-support rollers for circulating the sheet of paper so that the sheet of paper passes the respective photoconductive drums of said plurality of image forming units;

a belt charger for electrically charging said endless belt so that said endless belt and the sheet of paper are attracted to each other;

a discharger for removing electrical charge from said endless belt;

transfer chargers, each transfer charger being disposed at a respective position beside said endless belt corresponding to a respective photoconductive drum of said plurality of image forming units, for transferring the image developed on said photoconductive drums to the sheet of paper; and at least one paper sensor disposed at a position proximate said endless belt for detecting a sheet of paper conveyed by said endless belt and generating an electrical signal in response to the sheet of paper;

paper feeding and ejecting means for feeding the sheet of paper to said transfer means and for ejecting the sheet of paper.

14. The image forming apparatus as claimed in claim 13, wherein said exposing device has an optical axis perpendicular to an extension of a line passing through the photoconductive drums of said plurality of image forming units, and said second mirror members are respectively installed at intersections of vertical lines passing through the plurality of positions along the optical axis and horizontal lines passing through centers of each of said photoconductive drums.

15. The image forming apparatus as claimed in claim 14, wherein the distance between the plurality of positions along the optical axis is half the distance between the centers of the photoconductive drums of said plurality of image forming units.

16. An image forming apparatus for forming an image on a sheet of paper comprising:

a plurality of image forming units, each image forming unit having a photoconductive drum for forming a latent image by exposure and a developing device for containing a respective color developer for developing the latent image, thereby providing different color developed images;

an exposing device for projecting light according to image information;

optical passage control means for controlling optical passage of the light projected from said exposing device to expose the photoconductive drum of a selected image forming unit among said plurality of image forming units, said exposing device having an optical axis perpendicular to an extension of a line passing through the photoconductive drums of said plurality of image forming units, said optical passage control means comprising:

a first mirror member movable to a plurality of positions at intervals along the optical axis of said exposing device for reflecting the light of said exposing device; and a first movable mirror movable in synchronization with said first mirror member along an extension of a line passing through intersections of vertical lines passing through the plurality of positions and horizontal lines passing through centers of said photoconductive drums, and moving to a selected intersection to reflect the light reflected by said first mirror member to respective photoconductive drums;

transfer means for transferring an image developed by the selected image forming unit from the photoconductive drum of the selected image forming unit onto a sheet of paper, said transfer means comprising:

two driving-support rollers, at least one of said driving support rollers being drivable;

an endless belt installed around said two driving support rollers for circulating the sheet of paper so that the sheet of paper passes the respective photoconductive drums of said plurality of image forming units;

a belt charger for electrically charging said endless belt so that said endless belt and the sheet of paper are attracted to each other;

a discharger for removing electrical charge from said endless belt;

transfer chargers, each transfer charger being disposed at a respective position beside said endless belt corresponding to a respective photoconductive drum of said plurality of image forming units, for transferring the image developed on said respective photoconductive drums to the sheet of paper; and at least one paper sensor disposed at a position proximate said endless belt for detecting a sheet of paper conveyed by said endless belt and generating an electrical signal in response to the sheet of paper;

paper feeding and ejecting means for feeding the sheet of paper to said transfer means and for ejecting the sheet of paper.

17. An image forming apparatus for forming an image on a sheet of paper comprising:

a plurality of image forming units, each image forming unit having a photoconductive drum for forming a latent image by exposure and a developing device for containing a respective color developer for developing the latent image, thereby providing different color developed images;

an exposing device for projecting light according to image information;

optical passage control means for controlling optical passage of the light projected from said exposing device to expose the photoconductive drum of a selected image forming unit among said plurality of image forming units, said optical passage control means comprising:

a plurality of first movable mirrors installed at a plurality of positions at intervals along an optical axis of said exposing device for reflecting the light of said exposing device; and a plurality of first mirror members, each first mirror member being fixedly installed at a height corresponding to a respective photoconductive drum of said plurality of image forming units for reflecting the light reflected by said first movable mirrors to the respective photoconductive drums;

transfer means for transferring an image developed by the selected image forming unit from the photoconductive drum of the selected image forming unit onto a sheet of paper, said transfer means comprising:

two driving-support rollers, at least one of said driving support rollers being drivable;

an endless belt installed around said two driving-support rollers for circulating the sheet of paper so that the sheet of paper passes the respective photoconductive drums of said plurality of image forming units;

a belt charger for electrically charging said endless belt so that said endless belt and the sheet of paper are attracted to each other;

a discharger for removing electrical charge from said endless belt;

transfer chargers, each transfer charger being disposed at a respective position beside said endless belt corresponding to a respective photoconductive drum of said plurality of image forming units, for transferring the image developed on said photoconductive drums to the sheet of paper; and at least one paper sensor disposed at a position proximate said endless belt for detecting a sheet of paper conveyed by said endless belt and generating an electrical signal in response to the sheet of paper;

paper feeding and ejecting means for feeding the sheet of paper to said transfer means and for ejecting the sheet of paper.

18. The image forming apparatus as claimed in claim 17, wherein said plurality of first movable mirrors each pivot at one end.

19. The image forming apparatus as claimed in claim 17, wherein said plurality of first movable mirrors each reciprocate across the optical axis at each of the plurality of positions.

20. An image forming apparatus for forming an image on a sheet of paper comprising:

a plurality of image forming units, each image forming unit having a photoconductive drum for forming a latent image by exposure and a developing device for containing a respective color developer for developing the latent image, thereby providing different color developed images;

an exposing device for projecting light according to image information;

optical passage control means for controlling optical passage of the light projected from said exposing device to expose the photoconductive drum of a selected image forming unit among said plurality of image forming units, said exposing device having an optical axis perpendicular to an extension of a line passing through the photoconductive drums of said plurality of image forming units, said optical passage control means comprising:
- a plurality of first movable mirrors installed at a plurality of positions at intervals along the optical axis of said exposing device for reflecting the light of said exposing device; and
- a second movable mirror movable along an extension of a line passing through intersections of vertical lines passing through the plurality of positions and horizontal lines passing through centers of said photoconductive drums, and moving to a selected intersection to reflect the light reflected by said plurality of first movable mirrors to respective photoconductive drums;

transfer means for transferring an image developed by the selected image forming unit from the photoconductive drum of the selected image forming unit onto a sheet of paper, said transfer means comprising:
- two driving-support rollers, at least one of said driving support rollers being drivable;
- an endless belt installed around said two driving-support rollers for circulating the sheet of paper so that the sheet of paper passes the respective photoconductive drums of said plurality of image forming units;
- a belt charger for electrically charging said endless belt so that said endless belt and the sheet of paper are attracted to each other;
- a discharger for removing electrical charge from said endless belt;
- transfer chargers, each transfer charger being disposed at a respective position beside said endless belt corresponding to a respective photoconductive drum of said plurality of image forming units, for transferring the image developed on said respective photoconductive drums to the sheet of paper; and
- at least one paper sensor disposed at a position proximate said endless belt for detecting a sheet of paper conveyed by said endless belt and generating an electrical signal in response to the sheet of paper;

paper feeding and ejecting means for feeding the sheet of paper to said transfer means and for ejecting the sheet of paper.

* * * * *

UNITED STATES PATENT AND TRADEMARK OFFICE
CERTIFICATE OF CORRECTION

PATENT NO. : 5,532,812
DATED : July 2, 1996
INVENTOR(S) : Choi et al.

It is certified that error appears in the above-indentified patent and that said Letters Patent is hereby corrected as shown below:

Column 5, Line 67, after "having" insert --a--;

Column 6, Line 23, after "includes" insert --a--;

Line 23, change "rollers" to --roller--;

Line 24, after "removing" delete --a--;

Line 41, after "each" insert --of--;

Column 7, Line 39, delete --the--;

Lines 44-45, delete --each are installed to--;

Column 9, Line 32, after "respective" insert --photoconductive drums--;

Line 33, delete --photoconductive drums--;

UNITED STATES PATENT AND TRADEMARK OFFICE
CERTIFICATE OF CORRECTION

PATENT NO. : 5,532,812
DATED : July 2, 1996
INVENTOR(S) : Choi et al.

It is certified that error appears in the above-indentified patent and that said Letters Patent is hereby corrected as shown below:

Column 9, line 41, after "driving" insert -- - --.

Signed and Sealed this

First Day of October, 1996

Attest:

BRUCE LEHMAN

Attesting Officer

Commissioner of Patents and Trademarks